United States Patent Office 2,910,040
Patented Oct. 27, 1959

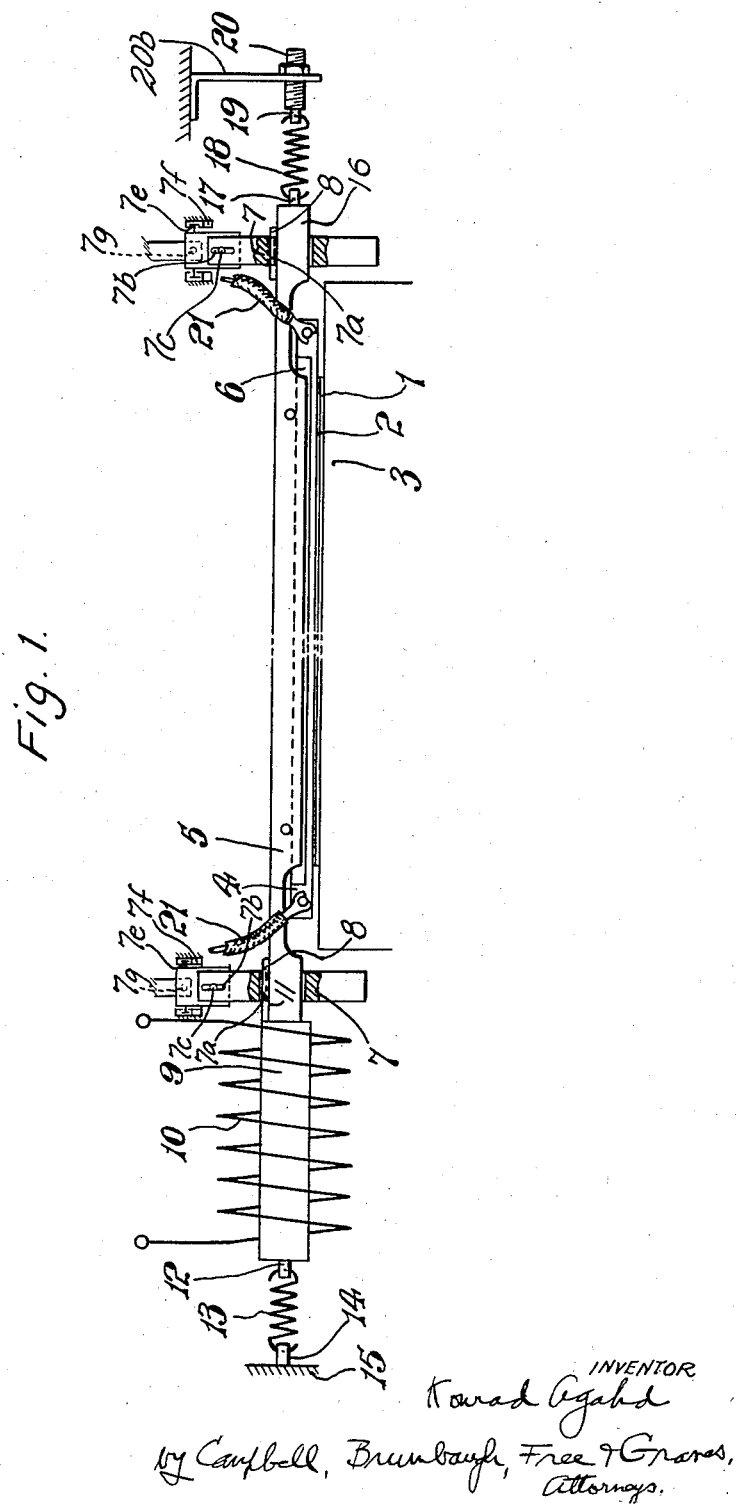

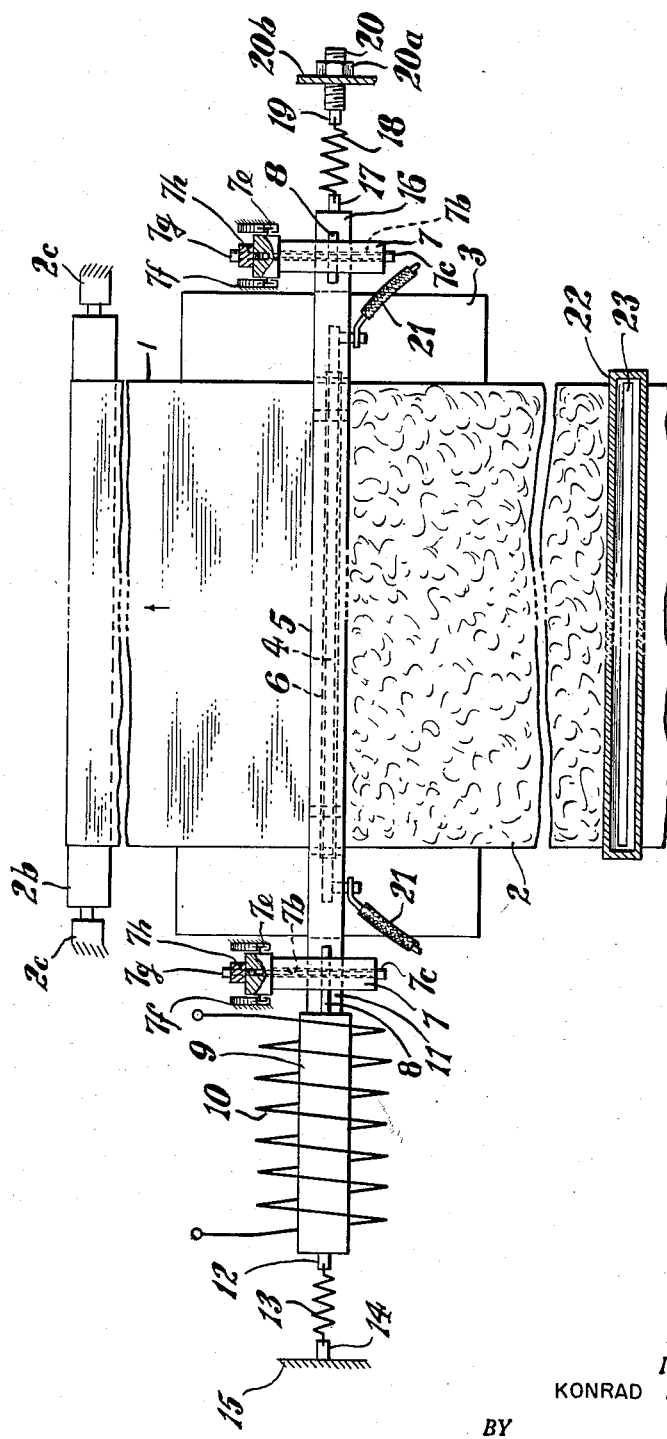

2,910,040

PROCESS AND APPARATUS FOR COATING STRIP MATERIAL

Konrad Agahd, Durach, near Kempten, Germany, assignor to Lever Brothers Company, New York, N.Y., a corporation of Maine Application December 18, 1953, Serial No. 399,224

Claims priority, application Germany September 18, 1952

13 Claims. (Cl. 118—57)

This invention relates to a process and apparatus for coating strip material and for producing foils of foil-forming material.

It is an object of the present invention to provide a process and apparatus for coating strip material, and in particular for coating strip material with a uniform thickness of a coating substance.

It is a further object of the present invention to provide a good adhesion or fusion between the coating substance and the strip material.

According to the present invention there is provided a process for coating strip material, which process comprises placing the coating substance on the strip material and subjecting it thereon to vibrations.

The coating substance is preferably subjected to vibrations by passing the strip material on which the substance is situated under a vibrating doctor blade which contacts the substance.

According to the present invention there is also provided an apparatus for coating strip material, which apparatus comprises a support for the strip material, a blade situated above the support, means for vibrating the blade, and means for moving the strip material past the blade.

The vibration of the blade is preferably along its longitudinal axis. The longitudinal axis of the blade is preferably at right angles to the direction of movement of the strip material.

The blade is preferably caused to vibrate by being mechanically connected to the core of an electro-magnet the winding of which is excited by means of an alternating current. The alternating current may be supplied at commercial frequencies, for example 50 or 60 cycles per second, or may be of a different higher, frequency.

The doctor blade is preferably in the form of a separate blade secured to a holder. The blade may, for example, be made of rubber or metal. The latter is particularly advantageous if it is desired to utilise the blade also to heat the substance, as it enables the blade to be heated by electric resistance heating. Other means of heating may also be employed. The edge of the blade can, if necessary, be adapted for various coating substances. A soft rubber blade having a strongly involute rounded-off edge has been found useful if it is desired to spread and even out the coating substance previously put on by rollers. The distance betwen the blade and the support is preferably adjustable.

The means for moving the strip material may comprise means for winding the material, after it has passed the blade, on to a roller. Alternatively, the means for moving the strip material may be an endless conveyor, in which case it also constitutes the support.

The coating substance may be in the form of solutions, aqueous dispersions, melted masses or solids, i.e. powder or chips. The coating material may, for example, be paraffin wax or polyethylene, or a dispersion based on a mixed polymerisate of polyvinyl chloride and polyvinyl acetate, the viscosity of which is adjusted by the addition of water and a water-soluble polyvinyl alcohol. The most suitable viscosity of the coating substance depends, inter alia, upon the operating conditions. It has been found that the viscosity should generally be not less than 9° Engler. The strip material may, for example, be Pergamin or cellulose paper or paper board.

The process and apparatus according to the present invention may also be used to produce foils of thermoplastic material. For that purpose the substance from which the foil is to be made is placed on a moving strip material such as an endless conveyor and subjected thereon to vibrations. The foil is then peeled off the conveyor. The endless conveyor may be made of any suitable material, for example, silicone bonded fabric, rubber, Teflon, or stainless steel; the actual choice of material depending upon the foil substance. It will be noted that the process and apparatus for producing foils are similar to those used for coating strip material except that the endless conveyor is employed as the strip material and also constitutes the support, and that the strip material moving means now becomes the conveyor moving means.

Further objects and advantages of the invention will be more readily understood when the following description is read in connection with the accompanying drawings in which:

Figure 1 is an elevation, partially in section, of coating apparatus in accordance with the present invention; and Figure 2 is a plan view, partially in section, of the apparatus shown in Figure 1.

The strip material 1 on which the coating substance 2 is to be applied is situated on the support 3. The support may be an endless conveyor belt or it may be a fixed support. In the latter case, a roll 2b journaled in suitably supported bearings 2c is provided for moving the strip material in a flat condition over the support.

The doctor blade 4 is secured to a holder 5, which may consist of a slotted tube. The blade is thermally and electrically insulated from the holder 5 by means of an insulator strip 6 having a U-shaped cross-section. The holder is mounted at both of its end in bearings 7. The ends of the holder are provided with keys 8 which are received by slots 7a in the bearings 7, the arrangement being such that the holder can move in the bearings longitudinally but cannot rotate relative to the bearings. The apparatus is provided with a vertical slot 7b carrying a bolt 7c received by a block 7d, this structure permitting movement of the bearings towards or away from the support 3 so as to adjust the distance between the support and the blade 4 and, hence, the thickness of the coating substance on the strip material. The apparatus is also provided with laterally extending flanged members 7e received in arcuate channels 7f having a common axis preferably coincident with that of the portion of the holder 5 in the bearings 7, bolts 7g extending through anchors 7h to provide for rotation of the bearings so as to vary the angle of incidence of the blade 4.

The core 9 of an electro-magnet having a winding 10 is secured to the end 11 of the holder 5. The winding 10 is connected to a source of alternating current of commercial frequency, for example, 50 or 60 cycles per second, to cause the core and, consequently, the blade to oscillate. The free end of the core 9 is provided with an eye 12. A helical spring 13 has one of its ends hooked into the eye 12, the other end being hooked into the eye 14 of a thrust block 15. The other end 16 of the holder 5 is provided with an eye 17. A helical spring 18 has one of its ends hooked into the eye 17, the other end being hooked into an eye 19 of a threaded thrust block 20 which can be moved along the axis of the holder 5 by a nut 20a bearing against a plate 20b to adjust the tension of the springs 10 and 18. The tension is adjusted so that the natural frequency of the blade 4 assembly equals that produced by the electro-magnet 9 and 10. The doctor blade 4, which in this embodiment is formed of metal, is provided at both its ends with cables 21 which are connected to a source of current (not shown) to heat the blade by electric resistance heating.

As shown in Figure 2, a feed hopper 22, shown in section, is formed with a suitably sized elongated slot-like feed opening 23. The hopper 22 extends across the strip material 1 in front of the blade 4 in order to deposit a desired coating substance 2 thereon. Obviously, other desired structures may be employed to deposit fluid or solid coating substances 2 on the strip material 1.

In operation, a desired coating substance 2 placed in the hopper 22 covers the strip material 1 irregularly, as indicated by the random lines shown ahead of the blade 4. When such material encounters the vibrating blade 4, which may be heated in the event a thermoplastic material is being used as the coating substance 2, it is rapidly vibrated transversely of the strip material 1, this action spreading it evenly over the strip material as indicated by the flat regular surface thereon behind the blade 4.

In one run, coarsely rasped paraffin wax was placed by hand on the horizontally moving strip material 1. No special attention was paid to the distribution of the paraffin wax on the strip material. As the paraffin wax came into contact with the electrically heated blade 4, it melted evenly over the whole width. It was observed that the vibrations of the blade 4 caused the still unmelted particles of wax to be vigorously jostled or vibrated to and fro and the melted wax to be thoroughly mixed, thereby increasing the uniformity of the coating.

In the case where the strip material 1 had a coarse fibrous nature, it was found that the vibrating blade 4 rubbed the coating substance strongly and deeply into the material. A deep penetration of and better adhesion to the fibrous layer was thereby obtained. However, as mentioned earlier, it is necessary that the viscosity of the coating substance is sufficiently high to ensure an adequate thickness of the coat after it has passed under the blade.

I claim:

1. Apparatus for coating a coating substance on a moving strip material comprising means for mounting a blade above and transversely to the direction of movement of the strip material, said blade being parallel to the strip material and adapted to engage the coating substance, a core coupled to the blade, and an electromagnet driving the core for vibrating said blade at a frequency of at least fifty cycles per second on its longitudinal axis parallel to the strip material.

2. Apparatus as defined in claim 1 in which means are provided for heating the blade.

3. Apparatus for coating a coating substance on a moving strip material comprising means for mounting a blade above and transversely to the direction of movement of the strip material, said blade being parallel to the strip material and adapted to engage the coating substance, resilient means opposing movement of the blade in either direction from a center position along its longitudinal axis, a core coupled to the blade, and an electromagnet driving the core for periodically urging said blade along its longitudinal axis at a frequency of at least 50 cycles per second to vibrate said blade.

4. Apparatus as defined in claim 3 in which means are provided for heating the blade.

5. Apparatus as defined in claim 3 wherein the resonant frequency of the resiliently mounted blade and the frequency of said periodic urging means are substantially equal.

6. Apparatus for coating a coating substance on a moving strip material comprising means for supporting a portion of the strip material, bearing means mounting a blade above the supported portion and transversely to the direction of travel of the strip material, said blade being parallel to the supported portion of the strip material and adapted to engage the coating substance, an electromagnet having a core coupled to the blade for periodically urging the blade along its longitudinal axis at a frequency of at least 50 cycles per second, and resilient means opposing movement of the assembly including the blade and the core along its longitudinal axis.

7. Apparatus as defined in claim 6 in which means are provided for electrically heating the blade.

8. Apparatus as defined in claim 6 wherein the resonant frequency of the resiliently mounted blade and the frequency of said periodic urging means are substantially equal.

9. Apparatus as defined in claim 6 wherein the bearing means are adjustable to vary the spacing between the blade and the supported portion of the strip material.

10. Apparatus as defined in claim 9 wherein the bearing means are adjustable to vary the angle of incidence of the blade.

11. Apparatus for coating a coating substance in the form of a removable foil on an endless conveyor comprising means for mounting a blade above and transversely to the direction of movement of the conveyor, said blade being parallel to the conveyor and adapted to engage the coating substance, resilient means opposing movement of the blade in either direction from a center position along its longitudinal axis, a core coupled to the blade, and an electromagnet driving the core for periodically urging said blade along its longitudinal axis at a frequency of at least 50 cycles per second to vibrate said blade.

12. Apparatus as defined in claim 11 in which means are provided for electrically heating the blade.

13. Apparatus as defined in claim 11 wherein the resonant frequency of the resiliently mounted blade and the frequency of said periodic urging means are substantially equal.

References Cited in the file of this patent

UNITED STATES PATENTS

| | | |
|---|---|---|
| 328,958 | Maxfield | Oct. 27, 1885 |
| 1,971,104 | Harter | Aug. 21, 1934 |
| 1,983,180 | McCarthy | Dec. 4, 1934 |
| 2,118,732 | Kruger | Sept. 1, 1942 |
| 2,294,520 | Staude | Sept. 1, 1942 |
| 2,318,504 | Lodding | May 4, 1943 |
| 2,498,214 | Ljungquist | Feb. 21, 1950 |
| 2,525,920 | Mackey | Oct. 17, 1950 |
| 2,652,773 | Halley | Sept. 22, 1953 |

UNITED STATES PATENT OFFICE
CERTIFICATE OF CORRECTION

Patent No. 2,910,040                                                    October 27, 1959

Konrad Agahd

It is hereby certified that error appears in the printed specification of the above numbered patent requiring correction and that the said Letters Patent should read as corrected below.

Column 1, line 59, for "betwen" read -- between --; column 2, line 3, for "inter alia" read -- _inter alia_ --; line 43, for "end" read -- ends --; column 3, line 24, after "blade 4." insert the following paragraph:

-- If desired, the edge of the blade may be provided with an electrical insulator in order to insulate it from the coating substance. --.

Signed and sealed this 12th day of April 1960.

(SEAL)
Attest:

KARL H. AXLINE                                            ROBERT C. WATSON
Attesting Officer                                         Commissioner of Patents